United States Patent Office 2,970,077
Patented Jan. 31, 1961

2,970,077
METHOD OF JOINING SURFACES

James H. Groves, Lombard, Ill., assignor to American Can Company, New York, N.Y., a corporation of New Jersey No Drawing. Filed June 28, 1955, Ser. No. 518,673

1 Claim. (Cl. 154—129)

The present invention relates to a method of bonding adjacent surfaces to one another by means of a synthetic resin adhesive, and has particular reference to a method of forming high strength metal-to-metal bonds in a very short time using a synthetic resin adhesive.

Two of the most important results desired in bonding by means of a synthetic resin adhesive are speed in effecting the bond and strength of the finished bond. Prior to the present invention it was substantially impossible to achieve, at least with metal, both of these results simultaneously by any known method. If a bond having exceptionally high strength was desired, it was often necessary to allow the adhesive to set for hours and even days with the attendant requirement of holding the pieces to be bonded to prevent displacement during the setting time. On the other hand if speed were the utmost requirement, i.e. a setting time of a few minutes or less, bonds of relatively low strength were obtained.

Another deficiency present in prior art methods is the inability to produce satisfactory bonds between all types of surfaces without the necessity of using a special adhesive and special conditions for bonding each type of surface.

Applicant, after considerable experimentation, has succeeded in overcoming the deficiencies of prior bonding methods and has attained both speed and a strong bond.

It is therefore an object of the present invention to provide a novel method of joining surfaces by means of a synthetic resin adhesive.

An additional object is to provide a substantially uniform method of bonding, with a synthetic resin adhesive, all types of metals together.

Another object is the provision of a method of effecting a high strength synthetic resin adhesive bond between metals at a high rate of speed.

Yet another object is to provide a method of rapidly bonding various metals together by means of a synthetic resin adhesive which bonds have a strength comparable to that of solder.

Numerous other objects and advantages of the invention will be apparent as it is better understood from the following description which is of a preferred embodiment thereof.

Broadly the method of the present invention comprises the steps of applying to at least one of the surfaces to be joined a synthetic, linear polyamide resin and an epoxy resin as an adhesion promoter for the polyamide, heating the resin and promoter to a temperature above the melting point of the resin, holding the surfaces contiguous one another and in contact with the molten resin-promoter composition for a brief period of time, and cooling the composition to a temperature below its melting point to harden it and thereby form a strong bond between the surfaces.

Included in the above steps are the following more specific methods of carrying out the present invention, method 1 below being preferred:

(1) Interposing solid polyamide and the adhesion promoter therefor between the surfaces to be joined to form an assembly, heating the assembly to a temperature above the melting point of the polyamide, holding the surfaces in contact with the molten polyamide and promoter for a brief period of time to permit the promoter and polyamide to react and to permit the molten composition to wet the surfaces, and thereafter cooling the assembly to set the adhesive;

(2) Applying to at least one and preferably to each of the surfaces to be joined, solid polyamide and the adhesion promoter therefor, heating the polyamide to a temperature above its melting point before the surfaces are brought together, maintaining the polyamide in a molten state on the separated surfaces for a very brief time interval to permit the polyamide and promoter to react, at least partially, and to permit the molten composition to wet the surfaces, assembling the surfaces with the molten composition disposed in between, after assembly maintaining the composition in a molten condition for an additional brief time interval to permit any further reaction between the polyamide and promoter and to permit the molten composition either to wet any bare metal surfaces in contact therewith or to merge into a continuous, uniform mass, and thereafter cooling the assembly to set the adhesives.

The linear polyamide resins useful in the present invention may differ considerably in method of preparation and starting materials. However common to all of these resins is the presence of a plurality of recurring groups having the structure:

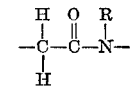

separated by alkylene groups containing at least two carbon atoms, and where R is hydrogen, lower alkyl of from 1 to 4 carbon atoms or lower alkoxy of from 1 to 4 carbon atoms, and having an intrinsic viscosity of at least 0.4. Intrinsic viscosity is defined in U.S. Patent 2,130,948 to W. H. Carothers. Polyamides in which R is hydrogen are preferred.

Among the polyamides which are useful in the present invention are polypentamethylene sebacamide, polyhexamethylene adipamide, polyhexamethylene sebacamide, polydecamethylene adipamide, polydecamethylene sebacamide, poly-m-phenylene sebacamide, 6-amino-caproic acid polymers, 7-amino-heptanoic acid polymers, 11-amino-undecanoic acid polymers, 12-amino-stearic acid polymers, as well as other polyamides and interpolyamides of the types mentioned in U.S. Patents 2,071,253; 2,130,523 and 2,130,948, issued to W. H. Carothers and U.S. Patent 2,285,009 issued to M. M. Brubaker et al.

The epoxy resin adhesion promoters for the polyamides belong to a class of complex, polymeric epoxy-hydroxy ethers resulting from the catalyzed reaction of a polyhydric alcohol, e.g. glycol, glycerine, trimethylol propane, polyhydric phenols and polyphenols, with an excess of an epoxide, e.g. epihalohydrins, alkylene oxides, as described in U.S. Patents 2,456,408 and 2,592,560, issued to S. O. Greenlee. The principal product of this reaction is a resinous epoxy glyceryl polyether comprising epoxy glyceryl radicals, hydroxyl or chloride substituted glyceryl radicals and the divalent residue of the polyhydric alcohol all united in a chain by ether oxygen atoms. From this class of polymeric epoxy-hydroxy ethers only those resins are operable that are liquid or at least flowable at room temperature, i.e. about 65° F., have an epoxide equivalent, i.e. number of grams of resin containing one gram-equivalent of epoxide, of about from 140 to 375, and have an average molecular weight of about from 290 to 750.

The polymeric epoxy-hydroxy ethers preferred for use in the instant invention may be represented by the following structural formula:

Polyether A

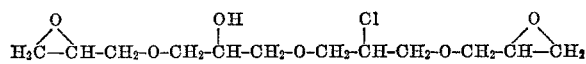

which is the reaction product of glycerine and an epoxide such as epichlorohydrin and has an epoxide equivalent of from 140 to 165; and Polyether B

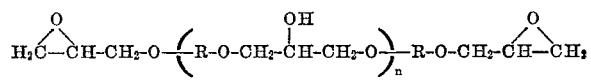

where $n$ is zero or a positive number (whole or fractional) less than 2 and R is the hydrocarbon radical of p,p'-dihydroxy-diphenyl-dimethyl methane (bisphenol-A). Polyether B is the reaction product of bisphenol-A and an epoxide such as epichlorohydrin and has an epoxide equivalent of about from 175 to 375 and an average molecular weight of about from 380 to 750.

It is believed that the outstanding adhesive properties of the polyamide-epoxy resin combination, when used according to the method of the present invention, are due to a reaction between epoxide groups and reactive hydrogen atoms, primarily N-hydrogen atoms, in the polyamide. This reaction takes place during the heating cycle of the method while the polyamide is in a molten state. However, prior to this reaction, the resin and promoter are brought together in a more or less physical combination. This physical combination may be accomplished in any suitable manner, for example: by treating a solid form of the polyamide, e.g. film, filament or rod, with a liquid promoter or a solution thereof in a volatile solvent; or a film of epoxy resin may be deposited on the surface that is to be bonded and the polyamide thereafter applied to the promoter carrying surface. Of these methods, the one whereby a solid form of the polyamide is treated with a solution of epoxy resin promoter is preferred.

The following examples are by way of illustration only and are not to be considered as limitations upon the scope of the invention.

*Example I*

A pre-formed film of plasticized 11-amino-undecanoic acid condensation polymer described in U.S. Patent 2,071,253 about 3 to 6 mils, i.e. .003 to .006 inch, thick was immersed in about a 10% solution of the above described Polyether A in butanol-toluene and immediately removed. After removal from the solution, the excess solution was allowed to drain off and any residual solvent was evaporated by drying the coated film at a moderately elevated temperature to produce an easily handled film.

A layer of the coated film of appropriate size was placed over each of two sheets of black iron, i.e. plain, sheet steel. The sheets and overlying films were heated to about 500° F. and held at this temperature for about 10 seconds after the film melted. The two sheets were then pressed together, cement sides facing each other, and held for an additional 15 seconds at the 500° F. temperature while maintaining a cement thickness of two to three mils between the metal sheets. The laminated sheets were then rapidly chilled to set the cement.

The polyamide of this example contains, as plasticizers, benzomonobutylamide and a mixture of o- and p-toluene ethyl sulfonamides. Either or both of these plasticizers may be omitted or other well known plasticizers substituted therefor.

*Example II*

A solid layer of resin cement from the same source and treated as in Example I was sandwiched between adjacent surfaces of two black iron sheets. The assembly was heated to and held at 500° F. during 30 seconds to melt the resin and allow the resin-promoter reaction product to wet the metal surfaces while maintaining a glue line thickness of 2 to 3 mils. The assembly was then cooled to set the cement quickly.

*Example III*

To one surface of each of two black iron sheets, on which had been roller coated a layer of the Polyether A as 100% solids, was applied a 3 to 6 mil layer of the plasticized polyamide of Example I. Thereafter the metal sheets and superposed layers were heated to 450° F. and held at this temperature for 10 seconds after the polyamide melted to allow the molten composition to wet the sheets. The sheets were then assembled with the molten cement disposed in between and held in this position for 30 seconds at 425° F. while maintaining a glue line of 2 to 3 mils. The assembly was then cooled to harden the adhesive.

*Example IV*

The method set forth in Example I was followed except that a 30% solution of a Polyether B described above, having an epoxide equivalent of 185 to 200 was substituted for the 10% solution of the Polyether A and the holding time for the assembled sheets was 30 seconds.

*Example V*

The plasticized 11-amino-undecanoic acid polymer of Example I was immersed in a 20% solution of a Polyether B having an epoxide equivalent of 190 to 210 in butanol-toluene and removed immediately. The film was then allowed to drain and dried for subsequent use.

To each of two black iron sheets, a layer of the treated film was applied. Each sheet with its resin layer was heated to 470° F. and held at this temperature for 15 seconds to permit the resin layer to melt and wet the metal surface. The two sheets were then pressed together with the adhesive disposed in between and the assembly was held in this position for another 60 seconds and at a temperature of 425° F. maintaining a glue line thickness of 2 to 3 mils. Thereafter the assembly was chilled to set the cement.

*Example VI*

The method set forth in Example I was repeated except that a 30% solution of a Polyether B having an epoxide equivalent of 190 to 210 in butanol-toluene was substituted for the 10% solution of the Polyether A and a holding time of 30 seconds was used after bringing together the metal sheets carrying the molten adhesive.

*Example VII*

The steps of Example I were repeated substituting an interpolyamide formed by interpolymerizing, by weight, 40% hexamethylenediammonium adipate, 15% hexamethylenediammonium salts of oleic acid oxidation acids and 45% 6-aminocaproic acid as described in U.S. Patent 2,285,009, for the 11-amino-undecanoic acid polymer and a 30% solution of Polyether A for the 10% solution. Also the holding time after joining the molten adhesive carrying surfaces was 60 seconds.

*Example VIII*

Example VII was repeated using a polyamide formed by interpolymerizing chemically equivalent amounts of pentamethylene diamine and ethyl sebacate as described in U.S. Patent 2,130,523, for the interpolyamide of Example VII and a holding time for the assembled sheets of 30 seconds.

The same procedure set forth in Example I, except for some variation in the time-temperature cycle, was successfully employed to bond metals having surfaces of nickel, zinc, tin, brass, aluminum, copper, various organic coatings, e.g. phenolic, oleoresinous, and inorganic coatings, e.g. metal chromate. With the chromate and phenolic coatings, a Polyether B having an epoxide equivalent of from 225 to 290 was used in place of the Polyether A and with the nickel surface a Polyether B having an epoxide equivalent of from 300 to 375 was employed. However, it is to be understood that the epoxy resin adhesion promoters may be used interchangeably with any surface and with any of the polyamides defined hereinbefore.

The following table compares the bond strength of the products of the above examples with those of a can makers 30% tin–70% lead solder bond and quick setting prior art organic adhesives having a bonding time of about 2 minutes or less. The prior art adhesives included in this class are: vinyl polymers and copolymers; acrylate and methacrylate polymers; urea-formaldehyde polymers; amine-cured epoxy resins; low molecular weight polyamides having an intrinsic viscosity of less than 0.4; epoxy-polysulfide rubber (Thiokol) compositions; and phenolic-Buna N (butadiene-acrylonitrile copolymer rubber) compositions. The data given in the table below is the peel strength of the adhesive, i.e. the force required to separate the laminated sheets by pulling an edge of one sheet in one direction and the opposed edge of the other sheet in the opposite direction over Canco roll guides at a speed of 1 inch per minute. The test is run using ¾ inch wide strips of the bonded sheets. The peel strength of the prior art adhesives is used as a control and is given as a peel strength range.

In the first ten samples listed in the following table, the bonds are formed between black iron surfaces. In the remaining samples, the type of surface bonded is specified.

| Sample: | Lbs. per .75 lineal in. |
|---|---|
| Control | 15–45 |
| Solder | 55 |
| Example I | 101 |
| Example II | 76 |
| Example III | 97 |
| Example IV | 100 |
| Example V | 91 |
| Example VI | 82 |
| Example VII | 91 |
| Example VIII | 97 |
| Nickel plate | 77 |
| Zinc plate | 68 |
| Tin plate | 87 |
| Brass | 42 |
| Aluminum | 61 |
| Phenolic coated steel | 79 |
| Chromatized steel | 49 |

Instead of the methods set forth in the examples, the polyamide with or without the promoter may be melted externally of the surfaces and applied to the surfaces in a molten state. If the molten polyamide contains no promoter, the promoter and polyamide must be combined on the surfaces to be joined. Including the promoter in the molten polyamide, while feasible, is not desirable because it was found to produce bonds of maximum strength most if not all of the reaction between the epoxy resin and polyamide should take place while the adhesive is in contact with the surfaces being joined. For this reason and because maintaining a reservoir of molten polyamide gives rise to problems of thermal decomposition, it is preferred to melt the polyamide during the bonding operation while it is in contact with the surfaces.

If the polyamide and promoter are applied to a surface to be bonded without appreciable reaction between the promoter and polyamide, e.g. a promoter treated film of polyamide is caused to adhere to the surface of a metal sheet by gently heating the sheet and pressing the film onto the warm sheet, they can be kept in this manner for an extended period—at least up to 30 days—ready for the actual bonding operation without any loss of or detriment to adhesive potential.

In carrying out the method of the present invention no excessive pressure is necessary to bond the materials. On the contrary, pressure which tends to force the adhesive from between and out of contact with the surfaces to be bonded is to be avoided. It is necessary only that contact pressure be exerted on the pieces to be joined whereby the pieces are thoroughly wetted by the molten adhesive and a sufficient glue line thickness is maintained. It has been found that a final glue line thickness of from about 1 to 30 mils provides satisfactory bonds with the preferred thickness being from 1 to 5 mils. Since a certain amount of squeezing does take place, a cement thickness from 2 to 4 times thicker than the desired final glue line thickness is provided prior to exerting contact pressure.

If the assembly is to be moved during the bonding cycle it is advantageous to provide a means for holding the pieces in the desired position until the adhesive sets.

The time required to effect a bonding by means of the instant method is a function of the temperature at which the bonding is carried out, i.e. the higher the temperature used the less time is required. Since the adhesive must wet the surface being joined and the reaction between the epoxy resin and polyamide is best carried out in a liquid medium, it is necessary that a temperature at least above the melting point of the polyamide be used. The upper limit of operable temperature is determined by the temperature at which rapid thermal decomposition of the polyamide occurs and obviously must be below this decomposition temperature. For the polyamides disclosed hereinbefore these limits are between about 350° F. and 700° F. In actual operation of the instant method, temperatures from 425° F. to 600° F. are preferred. In the broad temperature range the time required varies from about 1 second to about 5 minutes, and in the preferred temperature range, the time varies from about 2 seconds to about 1 minute.

The amount of epoxy resin promoter needed to combine with the polyamide for the purpose of the instant invention is relatively small compared to the amount of polyamide. Weight ratios in the range of from about 0.025 to about 0.30 part of promoter per part of polyamide are operable. If in the present method, the polyamide is employed as a formed article, e.g. film, rod, etc., an amount of epoxy resin promoter is used equal to about from 2.0 to 12.0 milligrams of promoter per square inch of polyamide.

The method of the present invention is well suited to bonding the opposed marginal edge portions of sheet metal can bodies to form a solderless, high-strength, hermetic side seam. The instant method may be utilized to form a can body by first applying an epoxy resin treated film, in tape form, to the marginal edge portions of the flat blank from which the body is made. Thereafter, the steps set forth in any of the above examples may be followed to form the bond. The finished side seam may be of any conventional construction, i.e. full lap, lock and lap, full lock.

It is thought that the invention and many of its attendant advantages will be understood from the foregoing description, and it will be apparent that various changes may be made in the tsteps of the method described and their order of accomplishment without departing from the spirit and scope of the invention or sacrificing all of its material advantages, the method hereinbefore described being merely a preferred embodiment thereof:

I claim:

A method of uniting surfaces of metallic elements comprising applying to at least one of said surfaces a synthetic linear polyamide and the polymeric polyether reaction product of a polyhydric alcohol and an aliphatic epoxide, in which said linear polyamide is a condensation polymer of 11-amino undecanoic acid having a plurality of reactive hydrogen atoms and an intrinsic viscosity of at least 0.4 and said polyether reaction product having terminal epoxy glyceryl radicals and an epoxide equivalent of about from 140 to 375, heating said polyamide to a temperature between about 350° F. and 700° F. to melt said polyamide, holding said surfaces contiguous one another with the molten polyamide disposed therebetween, maintaining said polyamide in a molten state for from about 1 second to about 5 minutes to permit reaction between said polyamide and said polyether reaction product and to permit wetting of said surfaces by the reacted polyamide, and cooling said reacted polyamide to a temperature below its melting point.

References Cited in the file of this patent
UNITED STATES PATENTS

| | | |
|---|---|---|
| 2,589,245 | Greenlee | Mar. 18, 1952 |
| 2,705,223 | Renfrew et al. | Mar. 29, 1955 |
| 2,707,708 | Wittcoff | May 3, 1955 |

OTHER REFERENCES

"Alloying With Epoxides," by J. Charlton, published in "Modern Plastics," September 1954, pages 155, 156 and 161.